(12) United States Patent
Kuittinen et al.

(10) Patent No.: US 10,025,018 B2
(45) Date of Patent: *Jul. 17, 2018

(54) ARRANGEMENT AND A METHOD FOR COUPLING LIGHT INTO A PLATE-LIKE LIGHT GUIDE

(71) Applicant: NANOCOMP OY LTD., Lehmo (FI)

(72) Inventors: Markku Kuittinen, Joensuu (FI); Pasi Laakkonen, Joensuu (FI)

(73) Assignee: NANOCOMP OY LTD, Joensuu (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,982

(22) Filed: Jun. 13, 2017

(65) Prior Publication Data

US 2017/0285240 A1 Oct. 5, 2017

Related U.S. Application Data

(63) Continuation of application No. 12/515,338, filed as application No. PCT/FI2006/000377 on Nov. 16, 2006, now Pat. No. 9,684,108.

(51) Int. Cl.
*G02B 6/34* (2006.01)
*F21V 8/00* (2006.01)

(52) U.S. Cl.
CPC ............. *G02B 6/0016* (2013.01); *G02B 6/34* (2013.01)

(58) Field of Classification Search
CPC .................. G02B 6/0016; G02B 6/34
USPC .......................................... 385/9–10, 37, 29
See application file for complete search history.

(56) References Cited

U.S. PATENT DOCUMENTS

| | | | | |
|---|---|---|---|---|
| 5,224,198 A * | 6/1993 | Jachimowicz | ......... | G02B 6/003 359/13 |
| 6,169,613 B1 * | 1/2001 | Amitai | .................. | G02B 5/188 359/15 |
| 7,206,107 B2 * | 4/2007 | Levola | ............... | G02B 27/0081 359/15 |
| 7,359,597 B1 * | 4/2008 | Iazikov | .................. | G02B 6/105 359/34 |
| 2004/0062502 A1 * | 4/2004 | Levola | ................. | G02B 5/1866 385/129 |
| 2004/0109234 A1 * | 6/2004 | Levola | ................. | G02B 5/1828 359/566 |
| 2005/0201899 A1 * | 9/2005 | Weisbuch | ............ | G01N 21/648 422/82.11 |

(Continued)

*Primary Examiner* — Thomas A Hollweg
*Assistant Examiner* — Guy Anderson
(74) *Attorney, Agent, or Firm* — Fay Sharpe LLP

(57) ABSTRACT

An arrangement (20) for coupling light into a plate-like light guide (25) having two surfaces (23, 24) on opposite sides of the light guide comprises an in-coupling diffraction grating (21) for diffracting an external light beam (26) incident on said in-coupling diffraction grating into the light guide in a direction enabling the in-coupled light beam to propagate within the light guide via total internal reflections at the light guide surfaces (23, 24). According to the present invention, the arrangement further comprises a deflection member (22) arranged to deflect the beam (27) initially diffracted by the in-coupling diffraction grating (21), before it hits the in-coupling diffraction grating again, out of the path determined by the in-coupling diffraction grating in order to reduce out-coupling of the already in-coupled light through the in-coupling diffraction grating.

17 Claims, 2 Drawing Sheets

(56) References Cited

U.S. PATENT DOCUMENTS

| | | | |
|---|---|---|---|
| 2006/0126179 A1* | 6/2006 | Levola | G02B 27/0081 359/563 |
| 2006/0228073 A1* | 10/2006 | Mukawa | G02B 6/0026 385/31 |
| 2008/0205838 A1* | 8/2008 | Crippa | G02B 6/124 385/126 |

* cited by examiner

ARRANGEMENT AND A METHOD FOR COUPLING LIGHT INTO A PLATE-LIKE LIGHT GUIDE

FIELD OF THE INVENTION

The present invention relates to coupling light into optical light guides, more particularly to coupling arrangements utilizing diffractive optics for coupling light into thin plate-like light guides.

BACKGROUND OF THE INVENTION

There are a number of applications where effective coupling of light into a light guide is desired. Some examples include different kinds of backlights and virtual displays designed to re-distribute light originally emitted e.g. by a LED (Light Emitting Diode).

A traditional approach is to feed the light into a plate-like light guide through its edge which gives a high coupling efficiency especially in the case of a light guide thicker than the beam size. However, in many applications it is the case that the thickness of the light guide is smaller than the size of the light beam to be coupled in. In these cases it is desirable to couple the light through the top or bottom surface of the light guide. The simplest solution is to use a diffraction grating on the side of incoming light of the light guide with a grating period suitable for in-coupling. This method is applicable as long as the lateral dimensions of the grating are up to about twice as large as the light guide thickness. In the case of reduced light guide thickness, the in-coupled light hits the grating area again after reflection at the opposite side of the light guide. Then, due to the reverse propagation of light, it is again coupled out, at the worst with the same efficiency as it was originally coupled in. This leads to great losses resulting in a poor total in-coupling efficiency. Thus, new optical designs must be used for achieving a sufficiently efficient coupling.

As one approach intended to avoid the problems described above, it is known to use radial grating geometry for a non-collimated LED light. With this kind of grating it has been possible to reduce the light guide thickness to 0.6 mm and this solution has also been successfully expanded to white light applications. However, in this kind of arrangement, the in-coupled light beam disperses in all directions in the plane of the waveguide without any possibility to confine its propagation in some particular direction.

Levola discloses in patent application US2005/0002611 A1 a structure for coupling light into a wave guiding substrate, the structure including a polarization converting element for changing the polarization state of the incoming light after the first interaction with the in-coupling grating. According to the description, changing the polarization from TE to TM between the first and the second interactions with the in-coupling grating makes it possible to design said grating so as to decrease reverse diffractions of the in-coupled light out from the light guide. As a result, the overall coupling efficiency is improved. It is reported that the coupling area can be made about two times wider than without the polarization element. However, an essential drawback of this solution is the limitation to specific polarization states of the light.

In solutions disclosed in patent publications JP11174270 and JP11281833, the coupling grating on a first surface of a waveguide formed on a substrate divides the incident light beam into two sub-beams propagating within the light guide with different directions. The basic idea of the disclosed solutions is that one of said sub-beams follows such a path that, after having been reflected at the second surface of the waveguide or from a buffer layer between the waveguide and the substrate, it is phase matched with another incident light beam and is coupled with it via an interferences phenomenon.

DE 4131738 A1 discloses an arrangement for in-coupling or out-coupling light between a waveguide and the ambient, the arrangement comprising two gratings. The waveguide has been formed on a glass plate substrate substantially thicker than the waveguide itself. There is a first grating on the surface of the waveguide guide serving as a redirecting element making light propagating within the waveguide diffract to the substrate. The light beam redirected or diffracted by the first grating has a predetermined intensity distribution. On the opposite surface of the substrate there is another grating serving as a phase correcting element correcting the phases of the light rays of the beam escaping the structure. The disclosed arrangement works also reversely for in-coupling. However, due to the thick substrate necessitated and the actually rather complex grating design needed to execute the functions described above, this particular approach is far from a generally applicable solution for coupling light into thin light guides.

PURPOSE OF THE INVENTION

The purpose of the present invention is to provide a novel solution for efficiently coupling light into thin light guides without the defects and limitations of the prior art techniques.

SUMMARY OF THE INVENTION

The arrangement and method for coupling light into a plate-like light guide according to the present invention are characterized by what is presented in claims 1 and 11, respectively.

In the most typical applications, the light to be coupled into the light guide is in the range of visible wavelengths. However, the principle of the present invention is basically not limited to any specific wavelength and it could be exploited in case of ultraviolet or infrared light as well.

The plate-like light guide has two surfaces on opposite sides of the light guide. Plate-like means here a structure having its lateral dimensions substantially greater than the thickness of the light guide. This kind of light guide is often substantially planar but there can be also applications where at least one of the light guide surfaces comprises an area which is slightly curved and/or tilted with respect to the surface on the opposite side of the light guide. It is also possible that the entire light guide is slightly bent.

The arrangement comprises an in-coupling diffraction grating for diffracting an external light beam incident on said in-coupling diffraction grating into the light guide in a direction enabling the in-coupled light to propagate within the light guide via total internal reflections at the light guide surfaces. The in-coupling diffraction grating can be a transmission type grating located near the light guide surface on the side of the incoming light. It is also possible that the in-coupling diffraction grating lies near the light guide surface on the opposite side of the light guide and is of reflection type, being possibly metallized. Being diffracted in said direction enabling total internal reflections at the light guide surfaces means that when the in-coupled light leaves the in-coupling area of the arrangement, typically after several interactions with the in-coupling diffraction grating and the opposite surface of the light guide as well as possible other optical elements in that area, it continues propagation within the waveguide without escaping it through the light guide surfaces. As is clear for a person skilled in the art, a direction in which total internal reflection at the light guide surface is possible depends on the difference in the refractive indices between the light guide and the ambient. It is of standard procedure for a professional to design such an optical arrangement that said condition of total internal reflections is fulfilled.

According to the present invention, the arrangement further comprises a deflection member arranged to deflect the light beam initially diffracted by the in-coupling diffraction grating, before it hits the in-coupling diffraction grating again, out of the path determined by the in-coupling diffraction grating. Said path determined by the in-coupling diffraction grating comprises naturally the initial direction of the in-coupled light beam, but includes also the propagation direction of the in-coupled light after a reflection at a light guide surface coplanar with the in-coupling diffraction grating. The purpose of the deflection member is to reduce out-coupling of the already in-coupled light through the in-coupling diffraction grating when hitting it again. Deflecting out of said path means that the deflected beam is no more in the direction of effective function of the in-coupling diffraction grating. Thus, the reverse coupling out from the light guide through the in-coupling diffraction grating is inefficient, thus leading to highly increased total coupling efficiency in comparison to a conventional arrangement based on one single grating only.

Depending on the actual design of the arrangement and the deflection member type, the deflection member can be arranged to deflect the beam initially diffracted by the in-coupling diffraction member in a direction out of and/or in a plane defined by the directions of the incident and the initially diffracted light beams.

Preferably, the deflection member comprises a deflecting diffraction grating. By means of a diffraction grating, the desired deflection can be realized effectively and accurately. For example, in the case of the in-coupling and deflecting diffraction gratings each consisting of straight and parallel grating lines and being placed on the coplanar opposite sides of the light guide, the deflection can be implemented simply by having the grating geometries being rotated, e.g. perpendicularly, with respect to each other. In addition to or instead of a diffraction grating, the deflecting member can also comprise different kinds of tilted facets or other optical elements providing effects other than diffraction.

In one preferred embodiment, at least one of the in-coupling diffraction grating and possible deflecting diffraction grating is a surface relief structure formed on one of the surfaces of the light guide. From a manufacturing point of view, a surface relief structure is the most straightforward approach. However, for example, for enabling mechanical washing of the surface of the light guide, at least one of the gratings can be formed as a buried structure within the light guide. This means that the grating is not the outermost layer of the light guide structure but there is an additional layer of the light guide body material or some other material on the grating. A buried grating structure can also be formed in a material differing from those of the traditional light guide materials and having possibly a higher refractive index.

Preferably, the in-coupling diffraction grating is an asymmetric grating, for example a slanted or a blazed grating, in order to confine the dispersion of the in-coupled light in the direction of the plane of the light guide. An asymmetric grating means here a grating providing diffraction efficiently into only one of the positive and negative diffraction order(s). For example, with a simple arrangement comprising perpendicularly located symmetric grating geometries, each consisting of parallel grating lines, the in-coupled light basically propagates in at least four gradually diverging cones which might be undesired in many applications. The confining effect can be maximized by choosing also the possible deflecting diffraction grating to be of asymmetric type. In such a case it is possible to provide only one direction of propagation in the plane of the light guide, provided that the both gratings diffract light into one diffraction order only.

In general, the present invention is not limited to any particular grating type but the type and the grating parameters can be selected freely to meet the requirements of the actual application. In addition to the basic case of collimated light of a single wavelength, the present invention is also suited for a partly diverging incident beam and for light consisting of several wavelengths. Designing the grating(s) to produce the desired effect(s) can be done by computer-aided calculation tools with procedures well known for those skilled in the art.

In one preferred embodiment, the in-coupling diffraction grating and the deflecting member both are optimized to maximize the total diffraction efficiency for unpolarized incident light. This means that the function of the arrangement is not dependant on some specific polarization state of the incoming light. This maximizes the versatility of the arrangement. Naturally, it is also possible to optimize each of the in-coupling diffraction grating and the deflecting member for any polarization state in accordance with the requirements of the actual application. Again, optimizing the gratings for unpolarized or for some specific polarization is of standard routines for those familiar with the diffractive optics. Thus, no detailed description about how to do it is needed here.

In a preferred embodiment, the thickness of the light guide is less than or equal to 1 mm, preferably less than or equal to 0.5 mm, most preferably less than or equal to about 0.05 mm. Already thicknesses like 1 or 0.5 mm provide significant improvements in the coupling efficiency when compared to the prior art solutions. In the case of incident light being in the form of a very narrow laser beam, suitable thickness of the light guide can be even as low as 0.05 mm. In such a case the advantages of the present invention over the prior art solutions are revolutionary.

In one preferred embodiment, the width of the in-coupling diffraction grating in the direction of the projection of the in-coupling grating's designed diffraction direction in the plane of the light guide is at least 4 times, preferably at least 8 times, for example 16 times as big as the thickness of the light guide. These kinds of widths together with a high in-coupling efficiency are not possible with conventional single grating systems. In the simple case of a grating consisting of straight grating lines, said direction defined above simply means the direction perpendicular to the grating lines.

The method for coupling light into a plate-like light guide having two surfaces on opposite sides of the light guide comprises a step of diffracting, by means of a diffraction grating, an external light beam incident on said diffraction grating into the light guide in a direction enabling the in-coupled light to propagate within the light guide via total internal reflections at the light guide surfaces. According to the present invention, the method also comprises a step of deflecting the light beam initially diffracted by means of the in-coupling diffraction grating, before it hits the in-coupling diffraction grating again, out of the path determined by the in-coupling diffraction grating in order to reduce out-coupling of the already in-coupled light through the in-coupling diffraction grating. Deflecting out of said path means here any way of changing the propagation direction of the in-coupled light into a direction differing from a direction of reflection from a plane coplanar with the diffraction grating. Deflecting can be performed through, for example, diffraction, reflection or refraction by means of a diffraction grating or some other optical element, respectively, or a combination thereof.

In one preferred embodiment, at the step of deflecting the light beam initially diffracted by means of the in-coupling diffraction grating, said light beam is deflected out of a plane defined by the directions of the incident and the initially diffracted light beams. On the other hand, the initially in-coupled light beam can also be deflected in a direction within said plane.

To summarize, the present invention provides numerous essential advantages over the prior art solutions. The in-coupling area of the arrangement can be far larger than in the conventional solutions suffering from undesired out-coupling in cases the incident light beam is substantially wider than the thickness of the light guide. The arrangement and method according to the present invention are not limited to any specific polarization state of the light and the basic inventive idea can be applied also to non-collimated and broadband light. The grating and deflection member types can be chosen freely to meet the actual requirements of the application at issue. A structure according to the present invention can be processed with standard manufacturing techniques suitable for cost-effective mass-production without any particular and complex extra steps.

BRIEF DESCRIPTION OF THE DRAWINGS

The accompanying figures, which are included to provide a further understanding of the invention and constitute a part of this specification, illustrate embodiments of the invention as well as prior art examples and, together with the description, help to explain the principles of the invention.

DETAILED DESCRIPTION OF THE INVENTION

Figure 1:
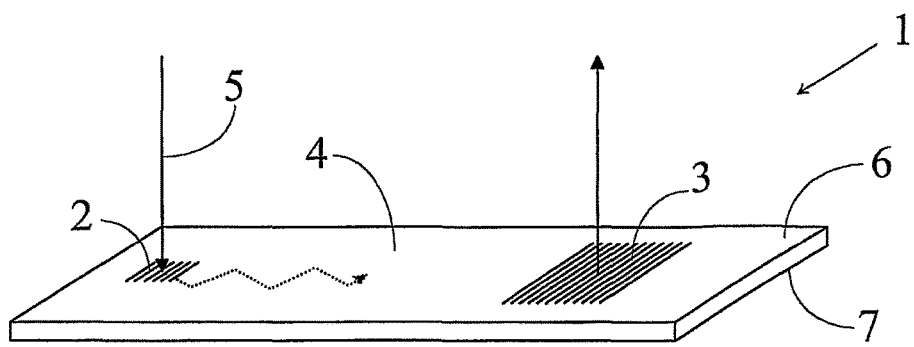
FIG. 1 shows the principle of a typical application of coupling light into a thin light guide.

In FIG. 1, an optical device 1 having an in-coupling region 2 and an out-coupling region 3 arranged on a thin light guide 4 is shown. The purpose of the in-coupling region is to diffract light 5 incident on it into the light guide in a direction which allows the diffracted light to propagate within the light guide via total internal reflections at the surfaces 6, 7 of the light guide. Correspondingly, the intended function of the out-coupling region is to couple the light propagating within the light guide again out of it. This kind of arrangement can be used e.g. in virtual displays or different kinds of illumination applications. Besides the basic configuration of FIG. 1, in some applications there can be several out-coupling regions around the in-coupling region.

Figure 2:
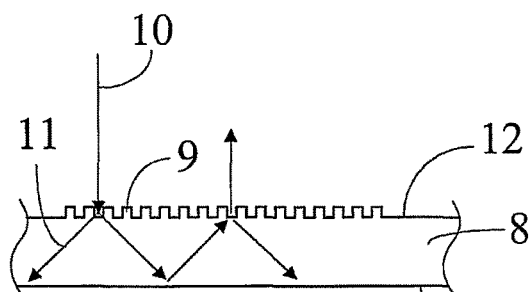
FIG. 2 represents a prior art coupling arrangement.

The main problem related to arrangements shown in FIG. 1 is that there has not been available a solution for effective in-coupling in cases where the light guide thickness is substantially smaller than the desired width of the diffractive in-coupling region. This problem can be understood from what is shown in FIG. 2 where a cross section of a prior art arrangement for in-coupling is shown. The arrangement comprises a light guide 8 on the upper surface 12 of which a binary type diffraction grating 9 has been formed. The diffraction grating is designed to diffract an incident light beam 10 into the light guide as diffracted beams 11 with directions allowing total internal reflections at the light guide surfaces 12, 13. If the area of the diffraction grating is wide enough, this kind of diffracted beam can hit the diffraction grating again after the first reflection at the bottom surface 13 of the light guide. Due to the reverse propagation of light, part of this beam is then coupled out of the light guide with an efficiency the same as that of the initial in-coupling. With an asymmetric type grating, the out-coupling could be less efficient but basically the problem still would exist. For example, with a slanted type diffraction grating, the light hitting the grating again would be reflected backwards and escape the structure along the same path it came in. The out-coupling means that the total in-coupling efficiency remains low. In practice, depending on the grating size and the light guide thickness, coupling efficiencies exceeding 20% are very difficult to achieve by this kind of arrangement. It is to be noted that the drawing of FIG. 2 is not in scale. The real dimensions of the grating line cross-sections typically are in a range of hundreds of nanometers while the light guide thickness can be, for example, about 0.5 mm. This is the case also for the drawings in the other figures.

Figure 3:
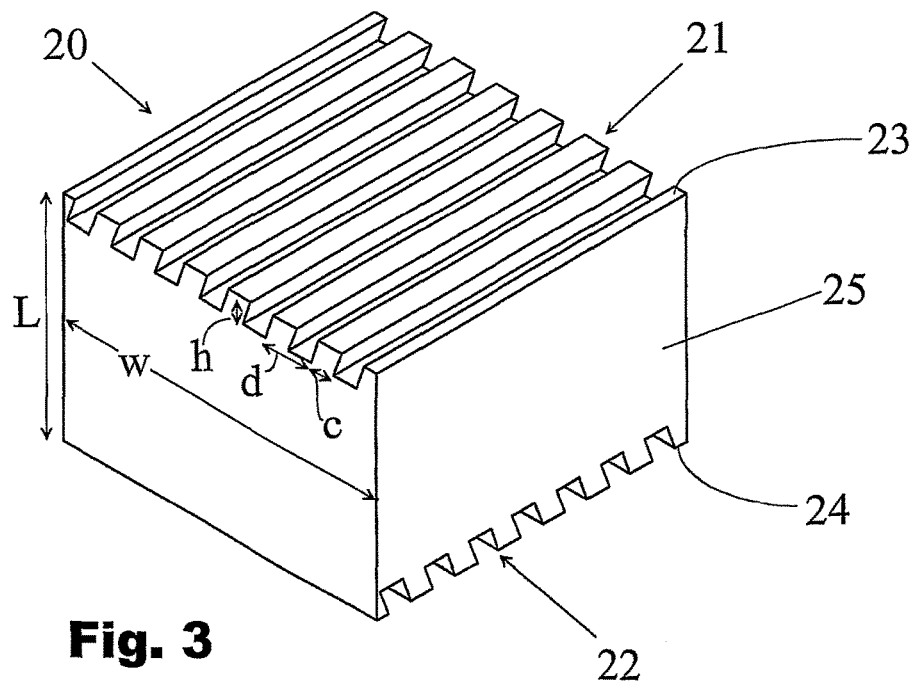
FIG. 3 shows an arrangement for coupling light into a light guide according to one preferred embodiment of the present invention.

A part of an in-coupling arrangement 20 according to the present invention is shown in FIG. 3. Contrary to the prior art solutions based on one binary type diffraction grating, there are two asymmetric slanted type diffraction gratings 21, 22 at the opposite surfaces 23, 24 of a light guide 25. In this example, the gratings are arranged perpendicularly to each other. The first one 21 of the gratings is designed to diffract incident light into the light guide so that it can propagate within the light guide via total internal reflections at the surfaces 23, 24 of the light guide. The other diffraction grating 22 on the opposite surface 24 of the light guide is intended for deflecting the initially in-coupled light sideways so that when the light beam hits the in-coupling diffraction grating again coupling out through it will be inefficient. Both of the gratings are designed to provide effective diffraction in the first diffraction order only. In this kind of embodiment where the gratings consist of simple straight grating lines, the parameters for each grating to be chosen in the design phase can include, for example, the grating period $d_i$, the width $c_i$ of the ridges of the grating, and the grating depth $h_i$ (i=1, 2). Other important parameters are the thickness L of the light guide and the width w of the in-coupling diffraction grating in the direction perpendicular to its grating lines.

Figure 4:
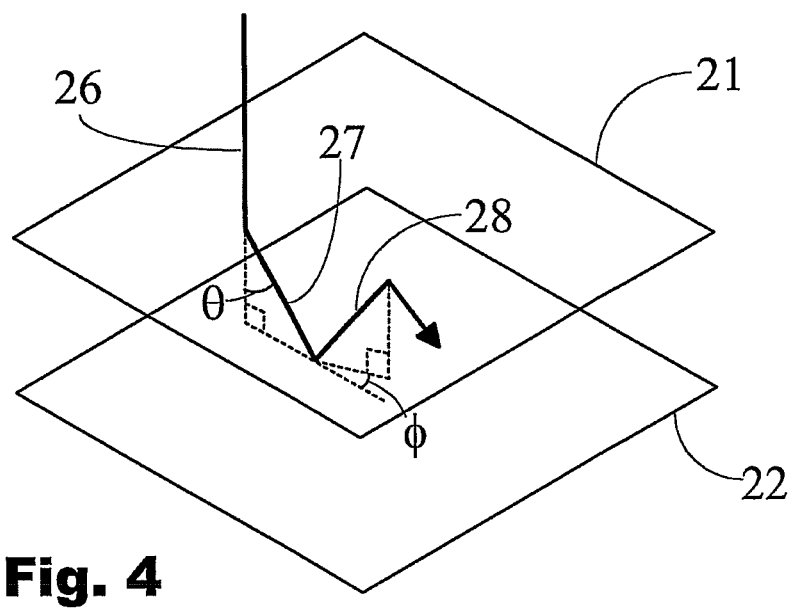
FIG. 4 illustrates the operation of the arrangement of FIG. 3.

The operational principle of the arrangement of FIG. 3 is illustrated in FIG. 4. An incident light beam 26 is firstly diffracted at the in-coupling grating 21 into the light guide in a direction according to the first diffraction order. This initially diffracted beam 27, when hitting the deflecting diffraction grating 22, is reflectively diffracted in a direction according to the first diffraction order of the deflecting grating. Due to the rotated position of the deflecting grating with respect to the in-coupling grating, this second diffraction makes the resulted beam 28 to be deviated sideways from a plane defined by the directions of the incident beam 26 and the initially diffracted beam 27. Thus, when interacting with the in-coupling grating 21 again, the light is no more in the direction of optimal function of that grating and is therefore not coupled out through it but is reflected downwards again. When designing this kind of arrangement, it needs to be taken into account that, when the angle φ of the direction of propagation with respect to said plane defined above is altered, also the angle θ with respect to the normal of the plane of the light guide changes. Thus, it must be ensured that, when finally exiting the in-coupling area of the light guide, the in-coupled light still propagates in a direction which enables total internal reflections at the light guide surfaces.

The performance of the present invention has been proved by simulations. For example, a simulation was performed for a very simple two-grating system with the in-coupling grating and the deflecting member being binary type gratings consisting of straight and parallel grating lines. The grating geometries were placed perpendicularly to each other as surface relief structures on the top and bottom surfaces of a 0.75 mm thick planar light guide having a refractive index of 1.50 for visible wavelengths. For the simulation, the in-coupling grating was designed with the main target being to produce maximum diffraction efficiency to the first transmitted diffraction orders for TE-polarized light. A straightforward optimization routine produced a grating period $d_1/\lambda=0.96$, a grating fill-factor $c_1/d_1=0.38$ (material), and a grating depth $h_1/\lambda=0.63$ where $\lambda$ is the wavelength of the light to be coupled in. For the deflection grating, a condition of keeping the beam propagation angle θ in relation to the normal of the light guide below 52° fixed the grating period to $d_2/\lambda=1.79$. Then the grating on the bottom surface was optimized so as to have maximum reflected diffraction efficiency to the first diffraction orders. After the optimization, the following parameters were obtained: $c_2/d_2=0.35$ (material) and $h_2/\lambda=0.30$. It is noticeable that this bottom side grating is almost polarization independent for all the propagating rays.

A ray trace analysis for the arrangement described above with grating sizes of 6×6 mm² and the incident beam hitting perpendicularly to the center of the coupling region, resulted in a total in-coupling efficiency of as high as 59% for input TE-polarization. This is far beyond the efficiencies normally achievable with corresponding single grating systems. In general, different analyses have shown that the two-grating arrangement usually provides efficiency at least about twice as high as that of a similar system with one grating only. The superiority of the present invention is even emphasized as the light guide thickness is decreased.

With reference to the examples described above, it is to be noted that the grating parameters need not be constant over the grating area. Instead, they may vary according to the incident light properties and the coupling performance desired. Neither need the grating lines be straight. For example, if the light is desired to propagate within the light guide in all directions, the in-coupling grating can consist of circular grating lines whereas the deflecting grating is then preferably formed to have a radial grating geometry. In addition to surface relief structures shown in the figures, one or both of the gratings could be embedded within the light guide. The in-coupling grating can also be of reflection type and located on or near the opposite side of the light guide to the side of incoming light. And as was stated earlier in this document, the deflection can also be implemented by some optical element based on some other effect than diffraction, e.g. reflection and/or refraction. To summarize in general, it is obvious for a person skilled in the art that the basic idea of the invention may be implemented in various ways. The invention and its embodiments are thus in no way limited to the examples described above but they may vary within the scope of the claims.

The invention claimed is:

1. An arrangement for coupling light into a plate-like light guide having two surfaces on opposite sides of the light guide, the arrangement comprising an in-coupling diffraction grating for diffracting an external light beam incident on said in-coupling diffraction grating into the light guide in a direction enabling the in-coupled light to propagate within the light guide via total internal reflections at the light guide surfaces, a deflection member arranged to deflect the light beam initially diffracted by the in-coupling diffraction grating, before it hits the in-coupling diffraction grating again, out of the path determined by the in-coupling diffraction grating in order to reduce out-coupling of the already in-coupled light through the in-coupling diffraction grating, wherein the path includes the initial direction of the in-coupled light beam and the propagation direction of the in-coupled light beam after an initial reflection at one of the light guide surfaces and wherein the deflection member is arranged to deflect the light beam initially diffracted by the in-coupling diffraction grating in a direction out of a plane defined by the directions of the incident and the initially diffracted light beams.

2. An arrangement according to claim 1, wherein the deflection member is arranged to deflect the light beam initially diffracted by the in-coupling diffraction grating in a direction along a plane defined by the directions of the incident and the initially diffracted light beams.

3. An arrangement according to claim 1, wherein the deflection member comprises a deflecting diffraction grating.

4. An arrangement according to claim 1, wherein at least one of the in-coupling diffraction grating and possible deflecting diffraction grating is a surface relief structure formed on one of the light guide surfaces.

5. An arrangement according to claim 1, wherein at least one of the in-coupling diffraction grating and possible deflecting diffraction grating is a buried structure formed within the light guide.

6. An arrangement according to claim 1, wherein the in-coupling diffraction grating is an asymmetric grating in order to confine the spreading of the in-coupled light in the direction of the plane of the light guide.

7. An arrangement according to claim 1, wherein the in-coupling diffraction grating and the deflection member are optimized to maximize the total in-coupling efficiency for unpolarized incident light.

8. An arrangement according to claim 1, wherein the thickness (L) of the light guide is less than or equal to 1 mm.

9. An arrangement according to claim 1, wherein the width (w) of the in-coupling diffraction grating in the direction of the projection of the in-coupling grating's designed diffraction direction in the plane of the light guide is at least 4 times as big as the thickness (L) of the light guide.

10. A method for coupling light into a plate-like light guide having two surfaces on opposite sides of the light guide, the method comprising a step of diffracting, by means of a diffraction grating, an external light beam incident on said diffraction grating into the light guide in a direction enabling the in-coupled light to propagate within the light guide via total internal reflections at the light guide surfaces wherein the method comprises a step of deflecting the light beam initially diffracted by means of the in-coupling diffraction grating, before it hits the in-coupling diffraction grating again, in order to reduce out-coupling of the already in-coupled light through the in-coupling diffraction grating, wherein the path includes the initial direction of the in-coupled light beam and the propagation direction of the in-coupled light beam after an initial reflection at one of the light guide surfaces and wherein the deflection member is arranged to deflect the light beam initially diffracted by the in-coupling diffraction grating in a direction out of a plane defined by the directions of the incident and the initially diffracted light beams.

11. A method according to claim 10, characterized in that, at the step of deflecting the light beam initially diffracted by means of the in-coupling diffraction grating, said light beam is deflected out of a plane defined by the directions of the incident and the initially diffracted light beams.

12. A method according to claim 10, wherein at the step of deflecting the light beam initially diffracted by means of the in-coupling diffraction grating, said light beam is deflected in a direction along a plane defined by the directions of the incident and the initially diffracted light beams.

13. An arrangement according to claim 1, wherein the thickness (L) of the light guide is less than or equal to 0.5 mm.

14. An arrangement according to claim 1, wherein the thickness (L) of the light guide is less than or equal to about 0.05 mm.

15. An arrangement according to claim 1, wherein the width (w) of the in-coupling diffraction grating in the direction of the projection of the in-coupling grating's designed diffraction direction in the plane of the light guide is at least 8 times as big as the thickness (L) of the light guide.

16. An arrangement according to claim 1, wherein the in-coupling diffraction grating is on one of a first of the light guide surfaces and the initial reflection is at the opposite of the two light guide surfaces.

17. A method according to claim 10, wherein the in-coupling diffraction grating is on one of a light guide surfaces and the initial reflection is at the opposite of the two light guide surfaces.

* * * * *